United States Patent

[11] 3,634,744

[72] Inventors Eyvand E. Toensing;
Robert E. Barbour, both of Minneapolis, Minn.
[21] Appl. No. 92,425
[22] Filed Nov. 24, 1970
[45] Patented Jan. 11, 1972
[73] Assignee Audiomatic Techniques, Inc. Minneapolis, Minn.

[54] PROGRESSIVE ELECTRIC MOTOR SPEED CONTROL RESPONSIVE TO THE DRIVEN SYSTEM
4 Claims, 3 Drawing Figs.

[52] U.S. Cl. .......... 318/225 R, 318/227, 318/212, 242/191
[51] Int. Cl. .......... H02p 5/28
[50] Field of Search .......... 318/6, 225, 227, 230, 211, 212; 242/190, 191

[56] References Cited

UNITED STATES PATENTS

| | | | |
|---|---|---|---|
| 3,324,372 | 6/1967 | Myers | 318/227 |
| 3,461,370 | 8/1969 | Canter | 318/227 |
| 3,488,017 | 1/1970 | Schatteman | 242/191 |
| 3,189,290 | 6/1965 | Welsh et al. | 242/190 |
| 3,341,141 | 9/1967 | Jura et al. | 242/190 |
| 3,375,424 | 3/1968 | Aye et al. | 318/227 |

*Primary Examiner*—Gene Z. Rubinson
*Attorney*—William J. McGinnis, Jr.

ABSTRACT: A motor speed control which may be used in a tape recorder to govern the speed of the takeup reel drive motor in response to the speed of the supply reel during a tape winding operation so that the tape is slowed down as the end of the tape supply on the supply reel approaches. In this application, a reference voltage, developed in proportion to the speed of the supply reel, drives a power control means in one leg of a permanent split capacitor induction motor to reduce the takeup reel motor speed as the supply reel speed increases thereby limiting linear tape speed as the end of the supply is exhausted. The motor control is a single power control unit which simultaneously varies the alternating current and a biasing direct current in a winding of the motor inversely to vary motor torque from full power to power absorbing.

PATENTED JAN 11 1972

3,634,744

INVENTORS
EYVAND E. TOENSING
ROBERT E. BARBOUR

BY Burd Braddock & Bartz

ATTORNEYS

PROGRESSIVE ELECTRIC MOTOR SPEED CONTROL RESPONSIVE TO THE DRIVEN SYSTEM

BACKGROUND OF THE INVENTION

This invention relates to a motor speed control which may be used to control the speed and torque of an electric motor by using a power control means to simultaneously regulate alternating and direct currents in one leg of an alternating current permanent split capacitor induction motor. More particularly, this invention may be applied to the art of tape recording to limit the speed of the takeup reel drive motor in response to increasing speed of the tape supply reel during a tape winding operation so as to limit linear tape velocity through the machine.

In modern tape recording machines, particularly of the type employing a cassette tape cartridge, the tape used has a magnetic oxide coating on a relatively thin substrate. In order to increase the quantity of tape wound on a reel of tape to lengthen the playing time of the tape, the tape is made of thinner film than previously so that the linear length of the tape may be increased on the same size supply reel. However, the tape has a relatively limited tensile strength and the tape must accordingly be protected from violent and abrupt shocks. In prior art tape recording equipment, when tape was wound from one reel to another, the linear tape speed would increase as the effective diameter of the takeup reel was increased by the diameter of the body of tape being wound thereon and similarly the supply reel speed was increased as its effective diameter diminished with the removal of the tape supply wound thereon.

It will be appreciated that with a large reel of tape, the linear speed of the tape would increase to a relatively high limit during the winding operation. However, the extremely thin modern tapes should not be subjected to the stresses of the continually increasing speed as the tape is being transferred from one reel to another, because the possibility of the tape being broken, stretched, or otherwise damaged increases. Of course, it is necessary to accomplish the tape winding operation in any tape recorder at as high a speed as practicable in order to increase the convenience to the recorder user. Also, the drive speed of the takeup reel cannot be limited at the start of a tape winding operation by the slower speed which would be desirable at the conclusion of the tape winding operation or the winding operation would take too long.

A problem peculiar to cassette cartridge recorders and playback units is that the tape is permanently secured to both reels of the cartridge. If the tape is abruptly stopped at the end of a winding operation by exhausting the tape supply, the attachment of the tape to the reel might become torn loose thereby greatly inconveniencing the user of the cassette cartridge. This would be particularly true in the case of an expensive prerecorded tape in which the program material might be damaged in the case of a tape break or in the loss of the attachment to one of the reels of the tape cartridge.

SUMMARY OF THE INVENTION

Accordingly, this invention provides an electric motor speed control which will allow the tape winding operation to proceed at a relatively high and increasing speed until a certain upper limit to this speed is reached. This is accomplished by controlling the speed of the takeup reel motor in response to the speed of the supply reel during a tape winding operation. The supply reel of the recorder drives a pulse producing switch, the output of which is passed through a wave-shaping amplifier and used to establish a voltage on a capacitor which is proportional to the frequency of pulses transmitted thereby as a measure of the speed of the supply reel.

The charge on the capacitor regulates a power control amplifier which is in series with one leg of a permanent split capacitor alternating current motor. The power control amplifier limits alternating current flow and hence the power and speed of the takeup reel drive motor in response to the increasing speed of the supply reel. In addition, the limiting of the alternating current flow in the circuit results in an increase in the proportion of biasing direct current in the motor winding to produce an internal loading of the motor. Accordingly, the linear tape speed may be limited to a predetermined maximum thus protecting the attachment of the tape to the reels in the cassette cartridge and otherwise preventing damage to the tape while allowing a relatively rapid tape winding operation. This will be particularly appreciated in view of the fact that at the beginning of the tape winding operation a relatively high-motor motor speed is desired because the effective diameters of the takeup reel and supply reel respectively are such that the tape initially travels at a relatively low-linear speed compared to takeup reel drive motor speed. The use of this invention allows a tape recorder takeup reel drive motor to operate at an initially relatively high rate of speed in order to accomplish a quick tape winding operation proceeds.

It will be appreciated that, in general, this invention provides a motor speed control which may be used to limit the speed of a permanent split capacitor electric motor in response to a simultaneous increasing of direct current bias in one motor winding and reduction of alternating current power in the same motor winding, thereby limiting maximum speed of the mechanism.

In the drawings

DESCRIPTION OF THE PREFERRED EMBODIMENT

Figure 1:
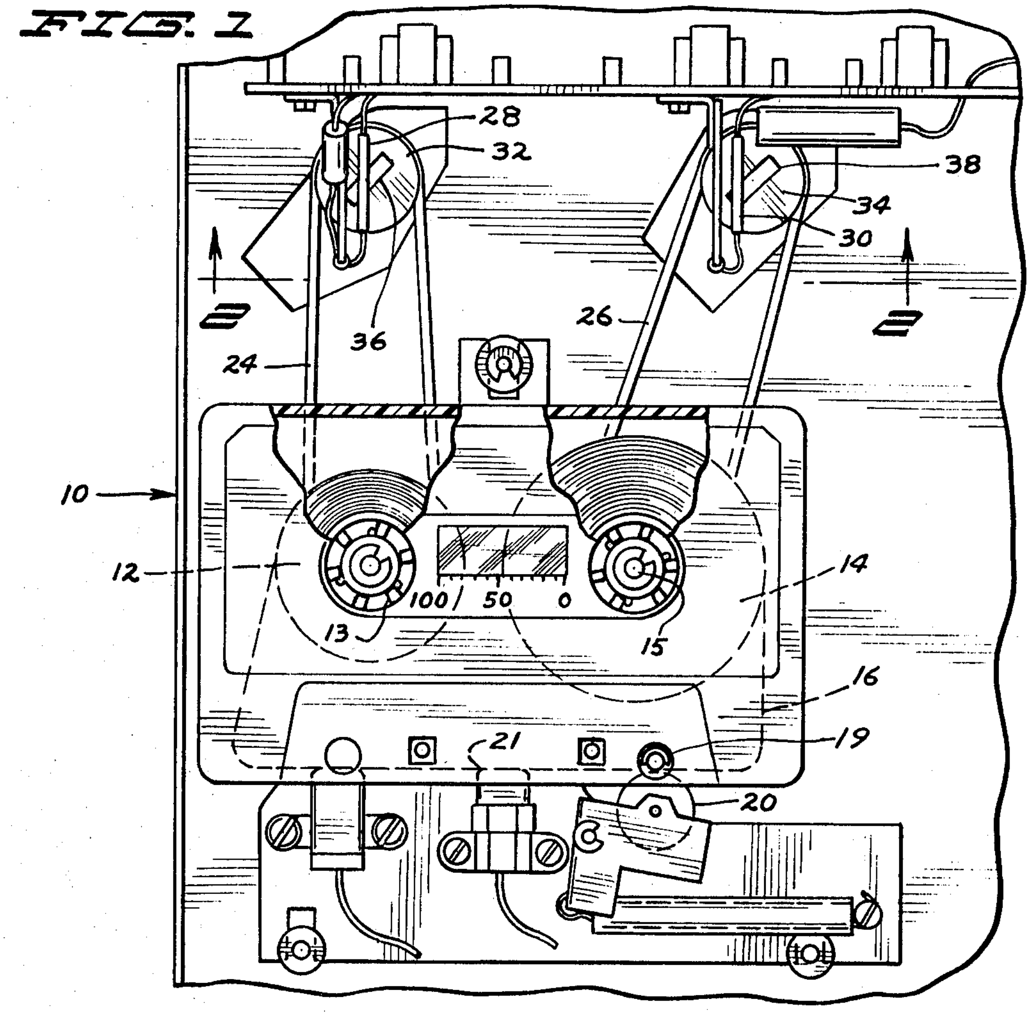
FIG. 1 is a top plan view of a tape recorder embodying the invention.
Figure 2:
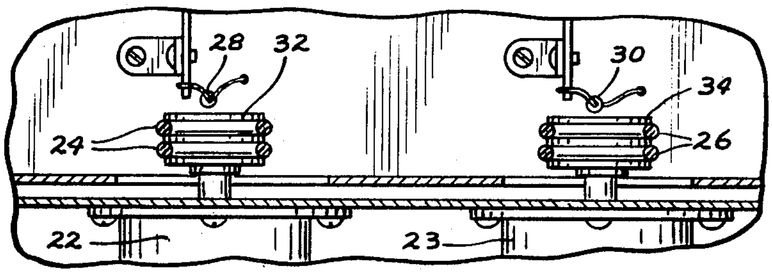
FIG. 2 is a side plan view along lines 2—2 of FIG. 1.

Referring now to FIG. 1, a tape recorder, generally designated by reference numeral 10, has a supply reel 12 mounted on a hub 13 and takeup reel 14 mounted on a hub 15. In the normal forward direction of operation magnetic recording tape 16 passes from the supply reel 12 to the takeup reel 14 through a drive system, generally designated 18. A capstan 19 and idler wheel 20 drive tape past a tape head 21. Motors 22 and 23 drive reels 12 and 14, respectively, through belt pairs 24 and 26. Magnetic reed switches 28 and 30 are associated with pulleys 32 and 34 having magnetic elements 36 and 38 embedded therein and which are associated with the drive belts 24 and 26. It will be appreciated that in the reverse or rewind mode the reel 14 will act as a supply reel and reel 12 will act as a takeup reel.

Figure 3:
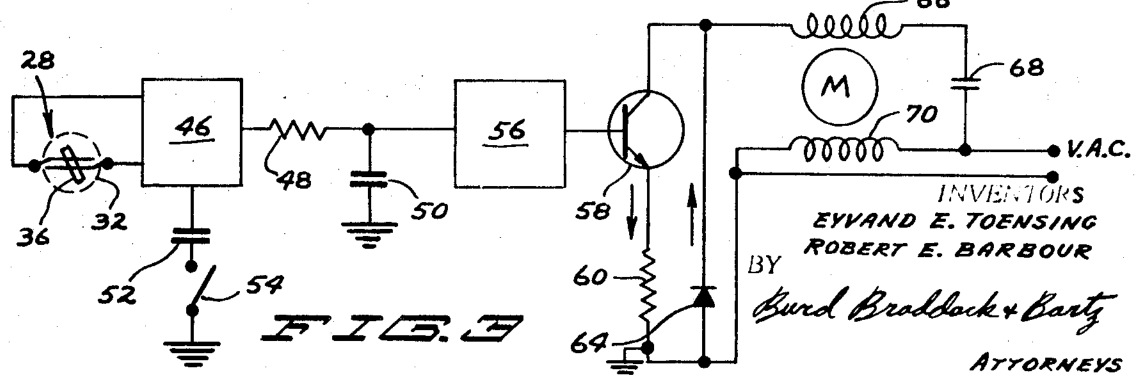
FIG. 3 is an electrical schematic diagram of the control circuit according to the present invention.

Referring now to FIg. 3, and assuming a forward direction of operation, magnetic reed switch 28 is shown diagrammatically in relationship to the drive pulley associated with the supply reel. When the tape recorder is operated in a rewind or reverse mode, switch 30 is connected in the circuit instead of switch 28. The output of the reed switch is a momentary closing of the switch circuit as the magnet associated therewith rotates.

The switch 28 is connected with a wave-shaping amplifier 46 which produces a pulse of uniform voltage and time duration for each input pulse from the magnetic reed switch regardless of the rate at which such impulses are received. The output of the wave-shaping amplifier is connected through a resistor 48 to a capacitor 50 on which charge is built up proportional to the number of pulses received from the wave-shaping amplifier per unit time. To the wave-shaping amplifier 46 is connected a capacitor 52 which may be inserted into the wave-shaping amplifier circuit with a switch 54. The capacitor 52 changes the time constant within the wave-shaping amplifier 46 to lengthen the duration of pulses produced thereby in response to the impulses received from the magnetic switch so that with this capacitor in the circuit a charge is built up to a greater level on the capacitor 50 with the same number of and rate of pulses produced by the magnetic reed switch.

The output of capacitor 50 is connected to a buffer amplifier 56 which drives a power control means comprised of an amplifying transistor 58 with a bias resistor 60 in the emitter thereof. The transistor 58 can conduct current during only one-half of the alternating current cycle, as indicated by the arrow. A diode rectifier 64 is connected across the power control circuit and provides a return path of flow during the opposite flowing half of the alternating current cycle, as indicated by the arrow. Transistor 58 is connected to the takeup reel drive motor which is motor 23 assuming a forward mode of operation. The transistor collector is connected to the capacitive shunt or field winding 66 of the motor. A capacitor 68 provides the required phase difference between the capacitive shunt winding 66 and the direct shunt or field winding 70 of the motor.

The power control means for the motor varies the power supply to the shunt winding 66 from pulsating direct current, one-half the alternating current cycle, when the transistor is at cutoff, to full-wave alternating current when the transistor is fully conducting. With a full alternating current wave, the motor will have full power, and with only pulsating direct current the motor will tend to remain stationary. A direct current bias in the winding 66, as provided by the diode 64, generates a positive braking effect in the motor, so that when the transistor is at cutoff, the motor would, for example, slow down and stop more quickly than if the winding were merely disconnected from power.

The regulation of the alternating current and pulsating direct current in the winding 66 is accomplished simultaneously using the single transistor 58. It will be appreciated that, as the transistor operates towards cutoff reducing the proportion of the one-half alternating current cycle passing therethrough, the proportion of alternating current passing through winding 66 is reduced simultaneously with an increase in the proportion of biasing pulsating direct current. The transistor 58 and the diode 64 may each be connected to separate windings of an appropriate motor designed to produce the proper magnetic field in conjunction with other windings to which alternating current is applied, rather than the single winding 66.

This effect of providing an internal loading or braking of the motor with direct current bias combined with the power control amplifier provides an accurate and stable motor torque control. The variation in motor torque is, of course, translated in most applications to variations in motor speed.

In operation, this motor speed control allows a tape winding operation to commence and to proceed without reduced speed of the takeup reel drive motor until the end of the operation nears. At that time the level of the charge produced by the increased rate of pulsing of the magnetic reed switch associated with the supply reel builds to a point so that the power control transistor begins to be biased towards cutoff on the portion of the alternating current cycle flowing therethrough. As this biasing to cutoff occurs, the amount of power applied to the capacitive shunt winding of the motor is decreased, the power and torque of the motor is decreased, and therefore the speed of the takeup reel is limited by the diminished power supplied to the takeup reel drive motor.

Operation of the switch 54 to place the capacitor 52 in the circuit will cause the level of charge established on capacitor 50 to be such that the speed of operation of the motor will be greatly reduced. This switch may be closed when the tape is to backspace only a short distance at low speed, as when the machine user wishes to repeat a few seconds of the tape.

The embodiments of the invention in which an exclusive property or privilege is claimed are defined as follows:

1. A speed control to be used in a tape recorder, or the like, to limit the lineal speed of strip material being transferred from a supply reel to a takeup reel comprising:

means, including an alternating current permanent split capacitor electric motor having at least two shunt field windings, for driving said takeup reel, means driven by said supply reel for producing an electrical signal at a rate which increases and decreases as the speed of the supply reel increases and decreases, means connected to said signal producing means for producing a varying control voltage as the rate of said signal increases and decreases, a power controlling means, the output of which is connected to said motor, and an input of which is connected to said control voltage producing means for progressively varying the power supply to said motor as the control voltage varies, said power controlling means being connected in such a way that the power supply to the motor is progressively decreased as the speed of the supply reel is increased to progressively decrease motor speed thereby tending to limit supply reel speed as the effective diameter thereof decreases and the effective diameter of the takeup reel increases during transfer of strip material, said power controlling means being further characterized in that said means is conductive in only one direction and is connected in series in the alternating current supply with one of said field windings, and a rectifier connected in parallel with said power controlling means and in series with said one field winding of said motor, said rectifier being conductive in a direction of current flow opposite to that of said power control means, so that at cut off of said power controlling means, only pulsating direct current flows through said one field winding, providing a breaking effect of said motor, and in full conduction of said power controlling means, the entire cycle of alternating current flows through said one field winding providing said motor with full power.

2. A speed control to be used in a tape recorder, or the like, to limit the lineal speed of strip material being transferred from a supply reel to a takeup reel comprising:

means, including an electric motor, for driving said takeup reel, means driven by said supply reel for producing an electrical signal at a rate which increases and decreases as the speed of the supply reel increases and decreases, means connected to said signal producing means for producing a varying control voltage as the rate of said signal increases and decreases, a power controlling means, the output of which is connected to said motor, and an input of which is connected to said control voltage producing means for progressively varying the power supply to said motor as the control voltage varies, said power controlling means being connected in such a way that the power supply to the motor is progressively decreased as the speed of the supply reel is increased to progressively decrease motor speed thereby tending to limit supply reel speed as the effective diameter thereof decreases and the effective diameter of the takeup reel increases during transfer of strip material.

3. The apparatus of claim 2 wherein said signal producing means is a switch actuated momentarily by switch actuating means driven by said motor, and wherein said signal producing means includes a signal generator which produces a uniform predetermined signal in response to each switch actuation and a capacitor which accumulates charge from said signal generator, the level of charge accumulated being a function of the number of signals received per unit time from said signal generator and the voltage of said capacitor determining the voltage produced by said control voltage producing means.

4. The apparatus of claim 3 and further comprising switch engageable means for changing the uniform predetermined signal produced by said signal generator to a signal which builds charge on said capacitor to a greater level with the same speed of the supply reel, thereby causing the power supply to said motor to be reduced, lowering the transfer speed of strip material.

* * * * *